United States Patent
Fujiwara

(10) Patent No.: US 10,075,611 B2
(45) Date of Patent: Sep. 11, 2018

(54) IMAGE PROCESSING DEVICE EXECUTING COMMUNICATION PROCESSING WITH PUSH NOTIFICATION SERVER AND INFORMATION PROCESSING DEVICE

(71) Applicant: Brother Kogyo Kabushiki Kaisha, Nagoya-shi, Aichi-ken (JP)

(72) Inventor: Susumu Fujiwara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 87 days.

(21) Appl. No.: 15/389,527

(22) Filed: Dec. 23, 2016

(65) Prior Publication Data

US 2017/0187914 A1 Jun. 29, 2017

(30) Foreign Application Priority Data

Dec. 24, 2015 (JP) .................................. 2015-252463

(51) Int. Cl.
H04N 1/00 (2006.01)
H04N 1/32 (2006.01)
H04L 29/08 (2006.01)

(52) U.S. Cl.
CPC ......... *H04N 1/32448* (2013.01); *H04L 67/26* (2013.01); *H04N 1/00228* (2013.01);
(Continued)

(58) Field of Classification Search
None
See application file for complete search history.

(56) References Cited

U.S. PATENT DOCUMENTS 8,095,172 B1* 1/2012 Cole .................... H04W 48/18
370/254
8,681,352 B2* 3/2014 Shenoy ................ G06F 3/1205
358/1.1
(Continued)

FOREIGN PATENT DOCUMENTS

JP 2015-028792 A 2/2015

OTHER PUBLICATIONS

U.S. Appl. No. 15/279,553 by Fujiwara, filed Sep. 29, 2016.*

*Primary Examiner* — Paul F Payer
(74) *Attorney, Agent, or Firm* — Banner & Witcoff, Ltd.

(57) ABSTRACT

An image processing device may first-receive print data and device identifying information from an information processing device. The image processing device may determine whether or not a particular event is occurring. The image processing device may first-store the received print data in a memory when the particular event is not occurring. The image processing device may second-store the received device identifying information in the memory when the particular event is occurring. The image processing device may send the device identifying information to a push notification server when the particular event has ended. The image processing device may second-receive print data from the information processing device corresponding to the sent device identifying information. The image processing device may third-store the received print data in the memory. The image processing device may print using the print data stored in the memory at least one of the first-storing and the third-storing.

12 Claims, 10 Drawing Sheets

(52) U.S. Cl.
CPC ..... *H04N 1/00307* (2013.01); *H04N 1/00344* (2013.01); *H04N 1/32117* (2013.01); *H04N 1/32518* (2013.01); *H04N 2201/3205* (2013.01)

(56) References Cited

U.S. PATENT DOCUMENTS

| | | | | |
|---|---|---|---|---|
| 8,854,677 | B2 * | 10/2014 | Oguma | G06F 3/12 358/1.15 |
| 2015/0199655 | A1 * | 7/2015 | Carey | G06Q 10/20 358/1.15 |

* cited by examiner

IMAGE PROCESSING DEVICE EXECUTING COMMUNICATION PROCESSING WITH PUSH NOTIFICATION SERVER AND INFORMATION PROCESSING DEVICE

CROSS-REFERENCE TO RELATED APPLICATION

This application claims priority to Japanese Patent Application No. 2015-252463, filed on Dec. 24, 2015, the contents of which are hereby incorporated by reference into the present application.

TECHNICAL FIELD

The technique disclosed in this description relates to an image processing device that is configured to execute print processing by receiving print data from an information processing device.

DESCRIPTION OF RELATED ART

A print control program for controlling print processing in a printer using an information processing device such as a portable terminal is known. When the A print control program is executed in the information processing device, print data can be sent from the information processing device to the printer. Further, the print processing using the print data can be executed in the printer.

SUMMARY

When a particular event such as printing is occurring in a printer, there may be a case where print data sent from an information processing device to the printer cannot be queued in the printer. As an example of the particular event, a case where a print data size exceeds an available memory size of the printer (for example, a case where despite the print data has been sent from the information processing device, a memory capacity of the printer is insufficient so the print data cannot be received), and a case where the printer does not accept the print data due to an occurrence of print failure error in the printer may be exemplified. At such an occasion, a user needs to wait until the particular event occurring in the printer is finished. Further, the user must confirm that the particular event has ended (that is, confirming that the available memory size has been provided or a print failure error state has been released), operate the information processing device, and re-send the print data to the printer. Convenience is failed since the user must monitor the state of occurrence of the particular events in the printer.

One technique disclosed in the present application is an image processing device. The image processing device may comprise a controller; a printer; a communication interface configured to communicate with a push notification server and an information processing device; and a memory. The controller may be configured to perform a first-receiving of receiving print data and device identifying information for identifying the information processing device from the information processing device through the communication interface. The controller may be configured to perform determining whether or not a particular event in which printing cannot be executed in the image processing device is occurring in the image processing device. The controller may be configured to perform a first-storing of storing the received print data in the first-receiving in the memory in a case where it is determined that the particular event is not occurring at the time when the device identifying information was received. The controller may be configured to perform a second-storing of storing the received device identifying information in the memory in a case where it is determined that the particular event is occurring at the time when the device identifying information was received. The controller may be configured to perform sending the device identifying information to the push notification server through the communication interface in a case where the device identifying information is stored in the memory and it is determined that the particular event has ended. The controller may be configured to perform a second-receiving of receiving print data from the information processing device corresponding to the sent device identifying information. The controller may be configured to perform a third-storing of storing the received print data in the second-receiving in the memory. The controller may be configured to print by the printer using the print data stored in the memory in at least one of the first-storing and the third-storing.

EMBODIMENT

First Embodiment

Figure 1:
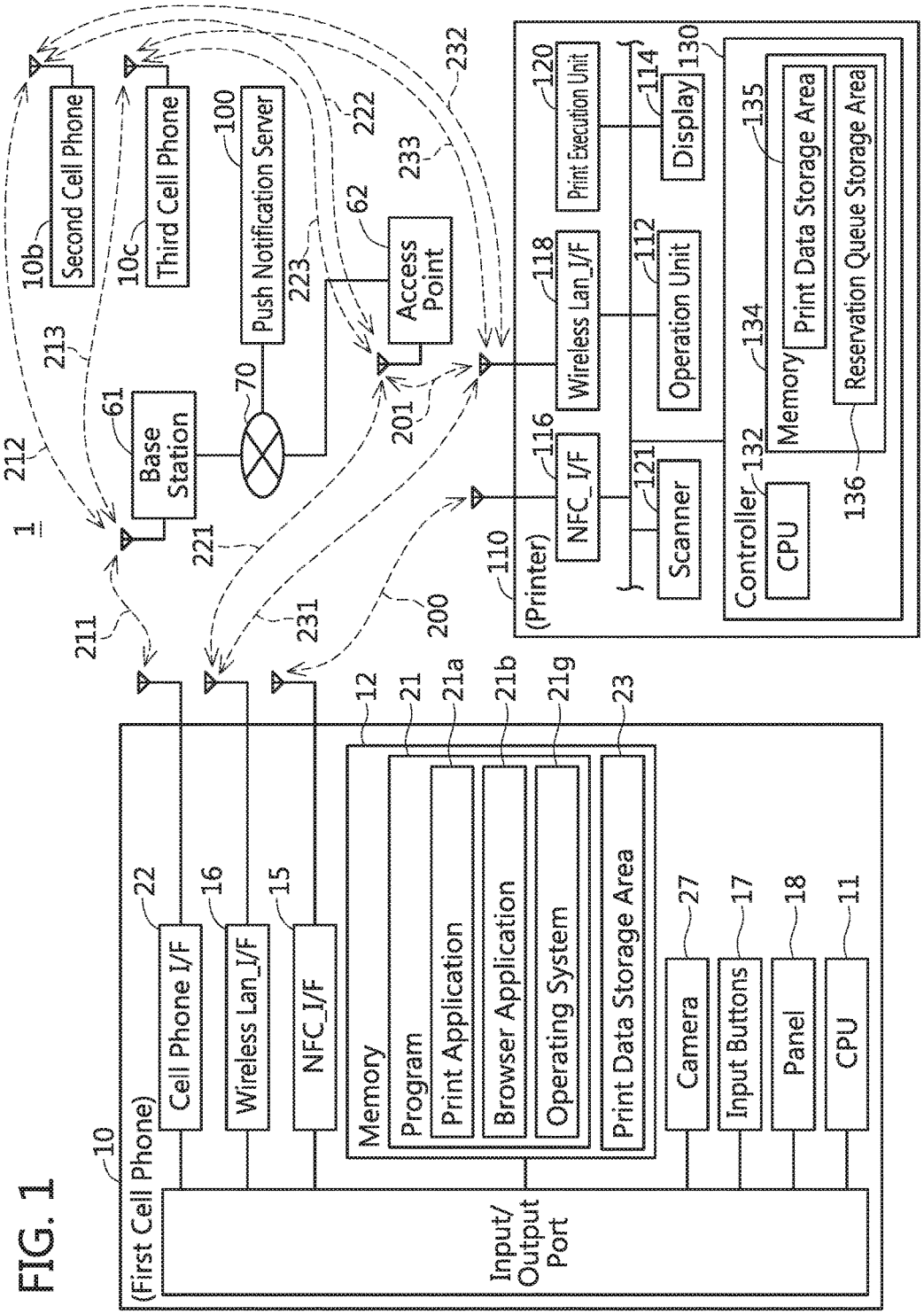
FIG. 1 shows a configuration of a communication system.

FIG. 1 shows a block diagram of a communication system 1 exemplified as an embodiment of the present application. The communication system 1 includes a first cell phone 10a, a second cell phone 10b, third cell phone 10c, a printer 110, an access point 62, a push notification server 100, and a base station 61. The access point 62 is a well-known relay device. The push notification server 100 can communicate with the first cell phone 10a, the second cell phone 10b and the third cell phone 10c through the Internet 70 and the base station 61. Further, the push notification server 100 can communicate with the printer 110 and the first cell phone 10a to the third cell phone 10c through the Internet 70 and the access point 62.

The first cell phone 10a is a cell phone mounted with the Android (registered trademark of Google Inc.) or the iOS (registered trademark of Cisco Systems, Inc.). The first cell phone 10a primarily includes a CPU 11, a memory 12, an NFC interface 15, a wireless LAN interface 16, input buttons 17, a panel 18, a cell phone interface 22, and a camera 27. The CPU 11 controls various functions according to programs stored in the memory 12 and various signals sent and received through the wireless LAN_I/F 16. Further, the CPU 11 serves as respective units for the functions by reading the programs. In this description the interface may be denoted as "I/F".

The NFC_I/F 15 is an I/F for executing a wireless communication 200 (hereinbelow referred to as "NFC communication 200") according to an NFC standards for a so-called near field wireless communication. That is, the NFC_I/F 15 is an IC chip, or a communication circuit therefor. The NFC standards is a wireless communication standards based on International Standards such as ISO/IEC 21481 or 18092. The cell phone I/F 22 performs a wireless communication 211 with the base station 61. The wireless communication 211 may be a wireless communication under a cellular standards such as 3G or 4G.

The wireless LAN_I/F 16 is an I/F for executing a wireless communication (hereinbelow referred to as "Wi-Fi communication") according to a wireless communication according to a Wi-Fi standards defined by the Wi-Fi Alliance. That is, the wireless LAN_I/F 16 is an IC chip, or a communication circuit therefor.

The wireless LAN_I/F 16 can communicate with a wireless LAN_I/F 118 of the printer 110 through wireless communications 201 and 221 in an infrastructure mode. Further, the wireless LAN_I/F 16 can directly communicate with the wireless LAN_I/F 118 of the printer 110 through a WFD communication 203 in a Wi-Fi Direct (registered trademark of Wi-Fi Alliance) (hereinbelow denoted as WFD) standards. That is, the first cell phone 10a can create a WFD network by establishing the connection with the printer 110 according to the WFD standards. In the WFD, the wireless communication based on the standard 802.11 of the IEEE or the standards according thereto (for example, 802.11a, 11b, 11g, 11n, etc.) is executed.

The input buttons 17 are keys for executing the respective functions of the first cell phone 10a. The input buttons 17 may be configured integrally to the panel 18 as a touch panel. The panel 18 displays respective function information of the first cell phone 10a.

The memory 12 includes programs 21 and a print data storage area 23. The print data storage area 23 is an area where print data to be sent to the printer 110 is queued. Notably, the memory 12 may be configured by combining a RAM, a ROM, a flash memory, an HDD, and an SD card (registered trademark of SD Association), and the like. The memory 12 may be a computer-readable storage medium. The computer-readable storage medium is a non-transitory medium such as a ROM, a RAM, a flash memory, or a hard disk. Electric signals that convey programs downloaded from a server on the Internet or the like are not included in the non-transitory medium.

The programs 21 include a print application 21a, a browser application 21b, and an operating system 21g (hereinbelow denoted as OS 21g). The OS 21g is a program that controls an entirety of the first cell phone 10a.

The print application 21a is an application for the printer 110 to print. The print application 21a is an application supplied by a vendor of the printer 110. The print application 21a may be installed in the first cell phone 10a from a server not shown on the Internet, or may be installed in the first cell phone 10a from a media shipped with the printer 110. The browser application 21b is an application for displaying web data acquired from the server not shown on the Internet on the panel 18.

Notably, since configurations of the second cell phone 10b and the third cell phone 10c are similar to that of the first cell phone 10a, so the description thereof will herein be omitted.

The printer 110 is a peripheral equipment that can execute a print function. That is, the printer 110 is a peripheral equipment of a PC or the like. The printer 110 includes an operation unit 112, a display 114, an NFC interface 116, the wireless LAN interface 118, a print execution unit 120, a scanner 121, and a controller 130. The respective units 112 to 130 are connected by a bus line (a reference sign not given).

The operation unit 112 includes a plurality of keys. A user can give the printer 110 various instructions by operating the operation unit 112. The display 114 is a display for displaying various type of information. The print execution unit 120 is a print mechanism such as an ink jet technology, a laser technology, and the like. The scanner 121 is a scan mechanism that scans a document and creates image data. Configurations of the NFC_I/F 116 and wireless LAN_I/F 118 are similar to the configurations of the aforementioned NFC_I/F 15 and wireless LAN_I/F 16, thus the descriptions thereof will herein be omitted.

The controller 130 includes a CPU 132 and a memory 134. The CPU 132 is a controller that executes various processes according to programs (not shown) stored in the memory 134. The memory 134 is configured of a RAM, a ROM, and the like. The memory 134 may be a computer-readable storage medium, similar to the memory 12. The memory 134 includes a print data storage area 135 and a reservation queue storage area 136. The print data storage area 135 is an area where the print data to be printed in the print execution unit 120 is queued.

The reservation queue storage area 136 is an area for storing print reservations in a "first-in first-out" list structure. The reservation queue storage area 136 stores a plurality of push notification IDs in the list structure. In a case where N pieces of push notification IDs (N being a natural number of 1 or more) are stored in the reservation queue storage area 136, it indicates that N items of print reservations are being set. In this case, the push notification ID stored first is the first reservation, and the push notification ID stored N-th is the N-th reservation.

The push notification server 100 is a server provided on the Internet 70. The push notification server 100 is a server that provides a push notification service. The push notification service is a service that allows the first cell phone 10a to the third cell phone 10c to receive push notification information containing various messages sent from the server not shown on the Internet 70. The push notification information allows the first cell phone 10a to the third cell phone 10c to receive the push notification information even under a state where the relevant application is not activated in the first cell phone 10a to the third cell phone 10c. The first cell phone 10a to the third cell phone 10c can display various notification images based on the received push notification information on the panel 18. An example of the notification images includes an image showing a notice of a new e-mail or an update of an application. An example of a framework for providing the push notification service includes an APNS (referred to as Apple Push Notification Service), or a GCM (referred to as Google Cloud Messaging for Android). The push notification is also called a remote notification, and it is notified from devices other than the device on which the application operates. The remote notification is created in the push notification server 100 when there is a message to be displayed or data to be downloaded is present, and is distributed to the operating system of the device. When receiving it, the operating system notifies the user of the application on the device. The user notification includes, other than the remote notification, a local notification. This notification is given to the user of the same device by the application scheduling it itself and processing the data as needed. The push notification server 100 may be a general server. Thus, the description of contents of the specific configurations provided in the push notification server 100 will be omitted herein.

(Notes on the Description in this Specification)

In the ensuing explanation, the CPU 11 to execute programs such as an application and the operating system 21g is sometimes simply referred to by the program name. For example, the indication of "print application 21a" may mean "the CPU 11 that executes the print application 21a". In this specification, the description "the CPU 11 of the first cell phone 10a receives various types of information" includes a technical content that "the CPU 11 of the first cell phone 10a receives the various types of information through the cell phone I/F 22, the wireless LAN_I/F 16, and the NFC_I/F 15". Further, the description "the CPU 11 of the first cell phone 10a sends various types of information" includes a technical content that "the CPU 11 of the first cell phone 10a outputs the various types of information through the cell phone I/F 22, the wireless LAN_I/F 16, and the NFC_I/F 15".

Here, a definition of the terms "data" and "information" will be explained. In the present specification, "information" is used as a concept superordinate to "data". Consequently, "data A" may be rephrased as "information A". Further, even in a case where the "information" has a different format as "data" (e.g., text format, binary format, flag format, etc.), this is treated as the same information as long as it is recognized that the meaning is the same. For example, as long as the device treats data as information indicating that the number of print copies is two parts, data of the text format "COPY=2", and data of the binary format "10" are the same information. However, the aforementioned distinction between "information" and "data" is not rigid, and exceptions to the rule are also allowed.

(Operation of Communication System)

Figure 2:
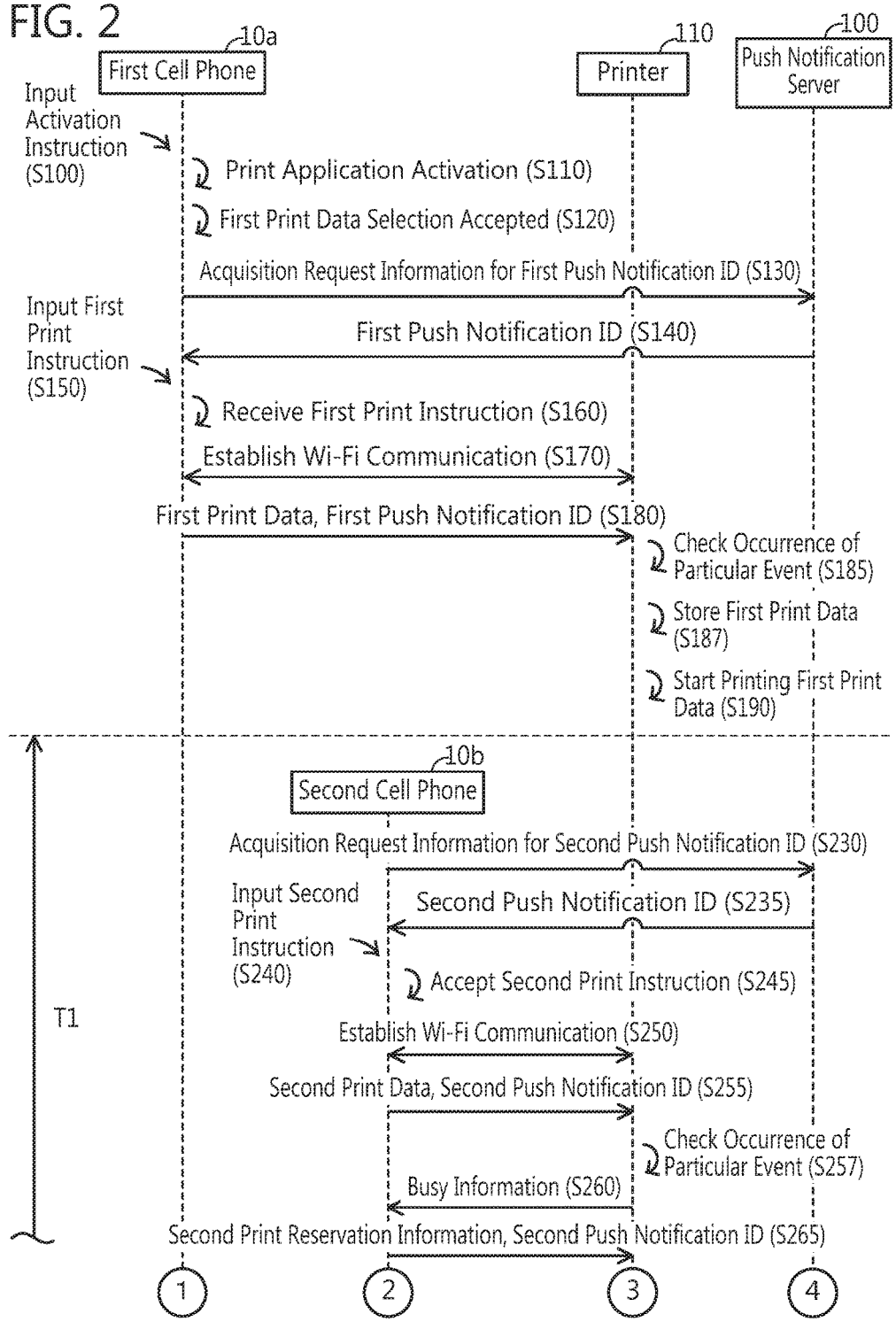
FIG. 2 shows a sequence diagram of the communication system of a first embodiment.
Figure 3:
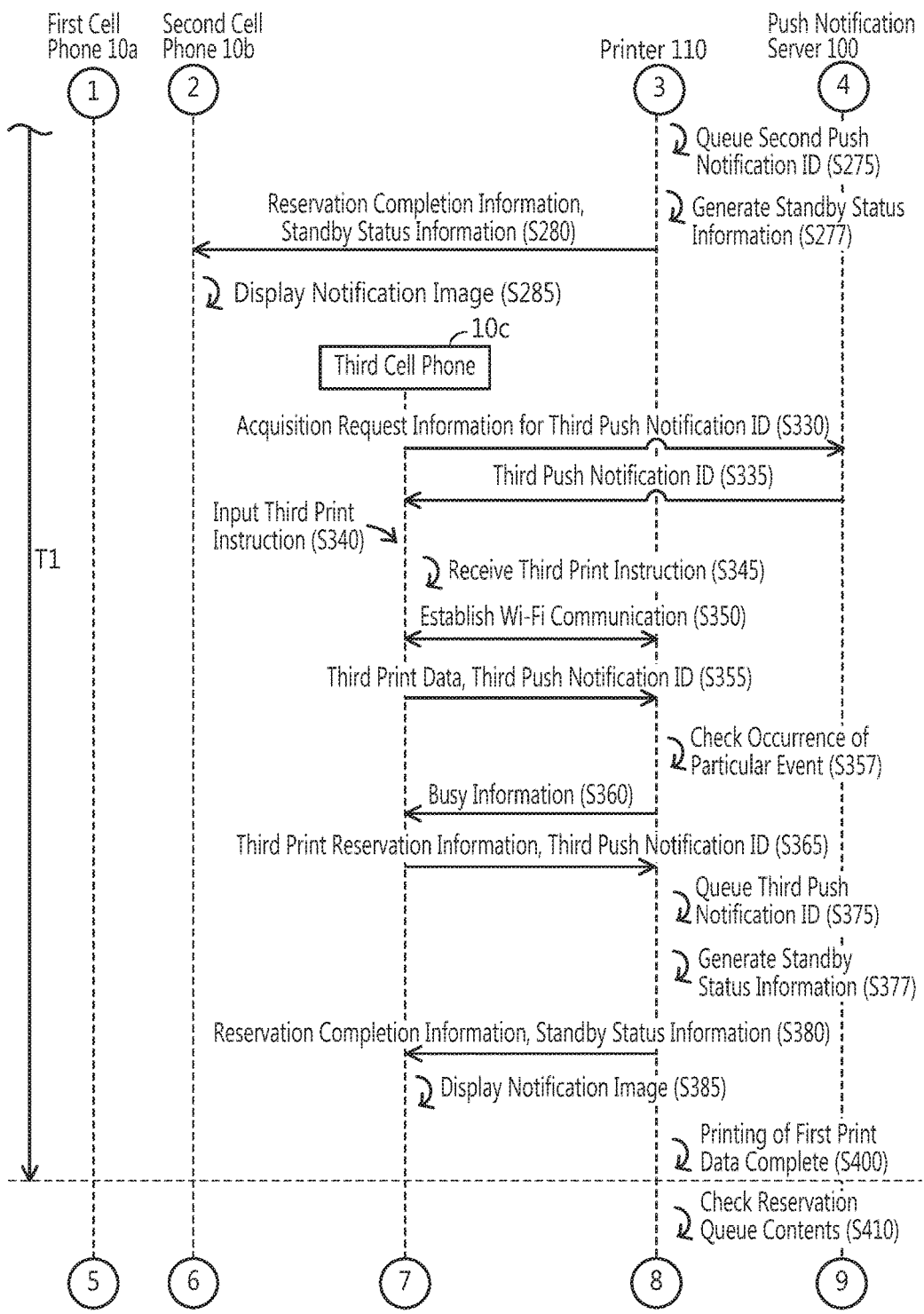
FIG. 3 shows a sequence diagram of the communication system of the first embodiment.
Figure 4:
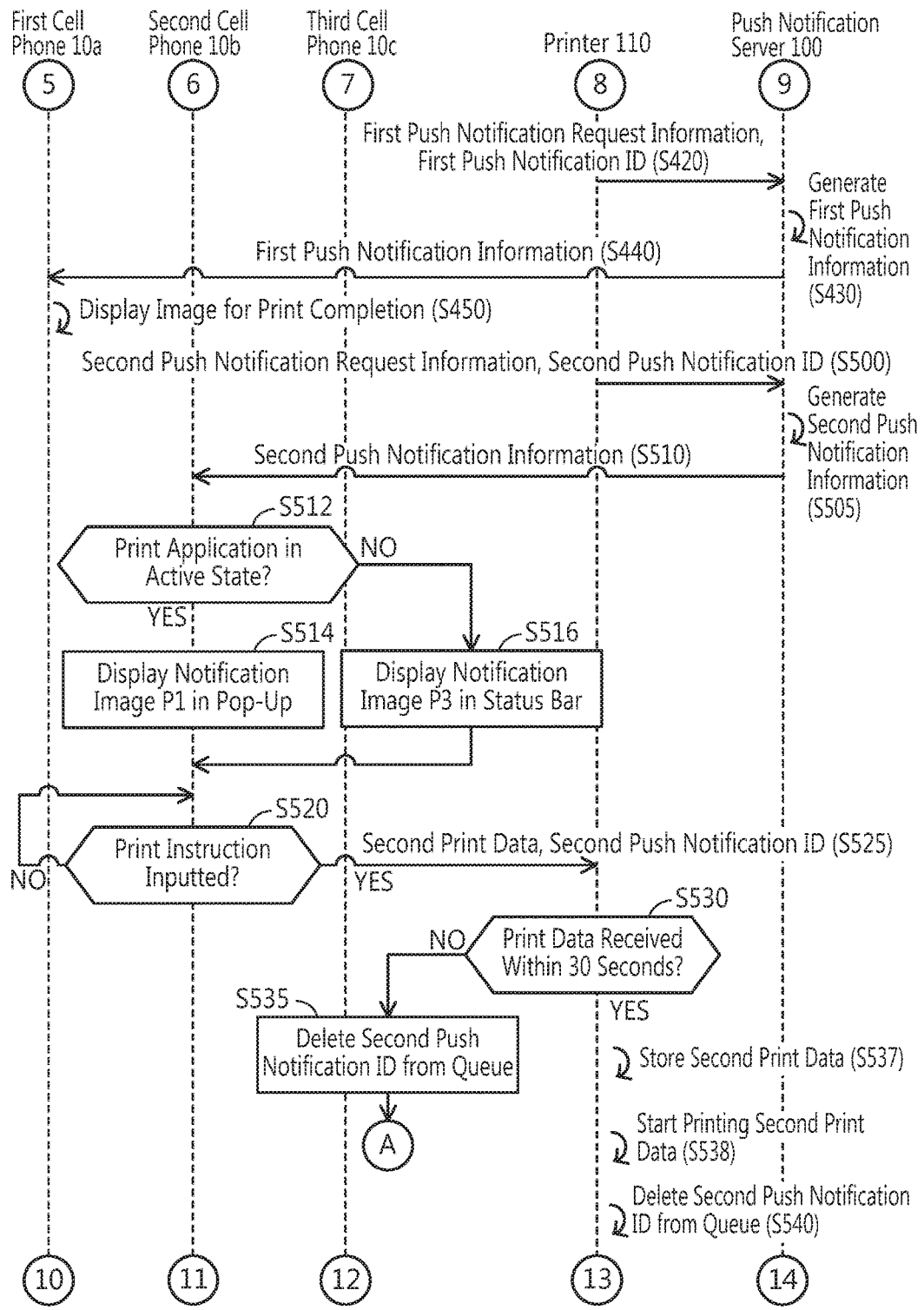
FIG. 4 shows a sequence diagram of the communication system of the first embodiment.
Figure 5:
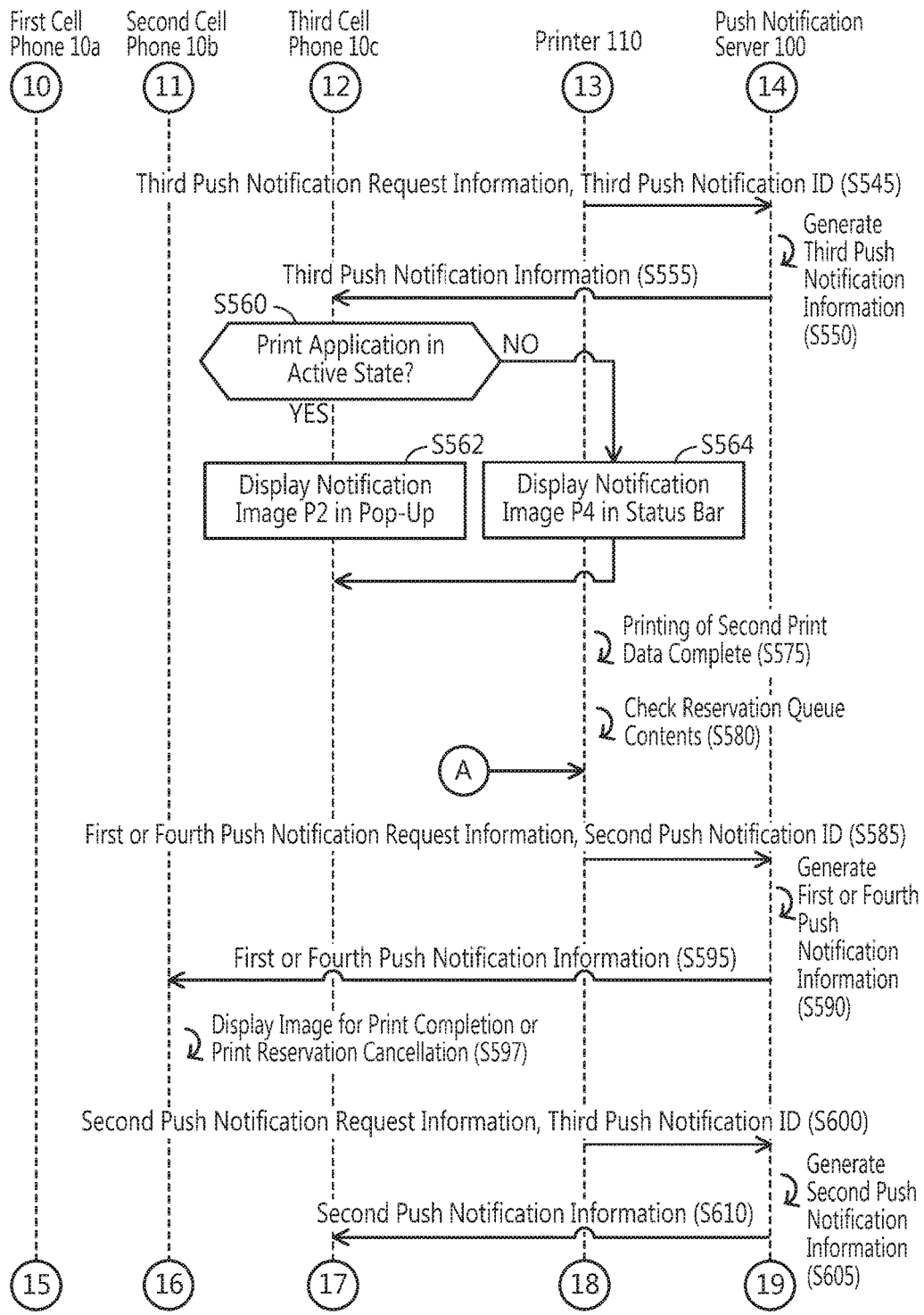
FIG. 5 shows a sequence diagram of the communication system of the first embodiment.
Figure 6:
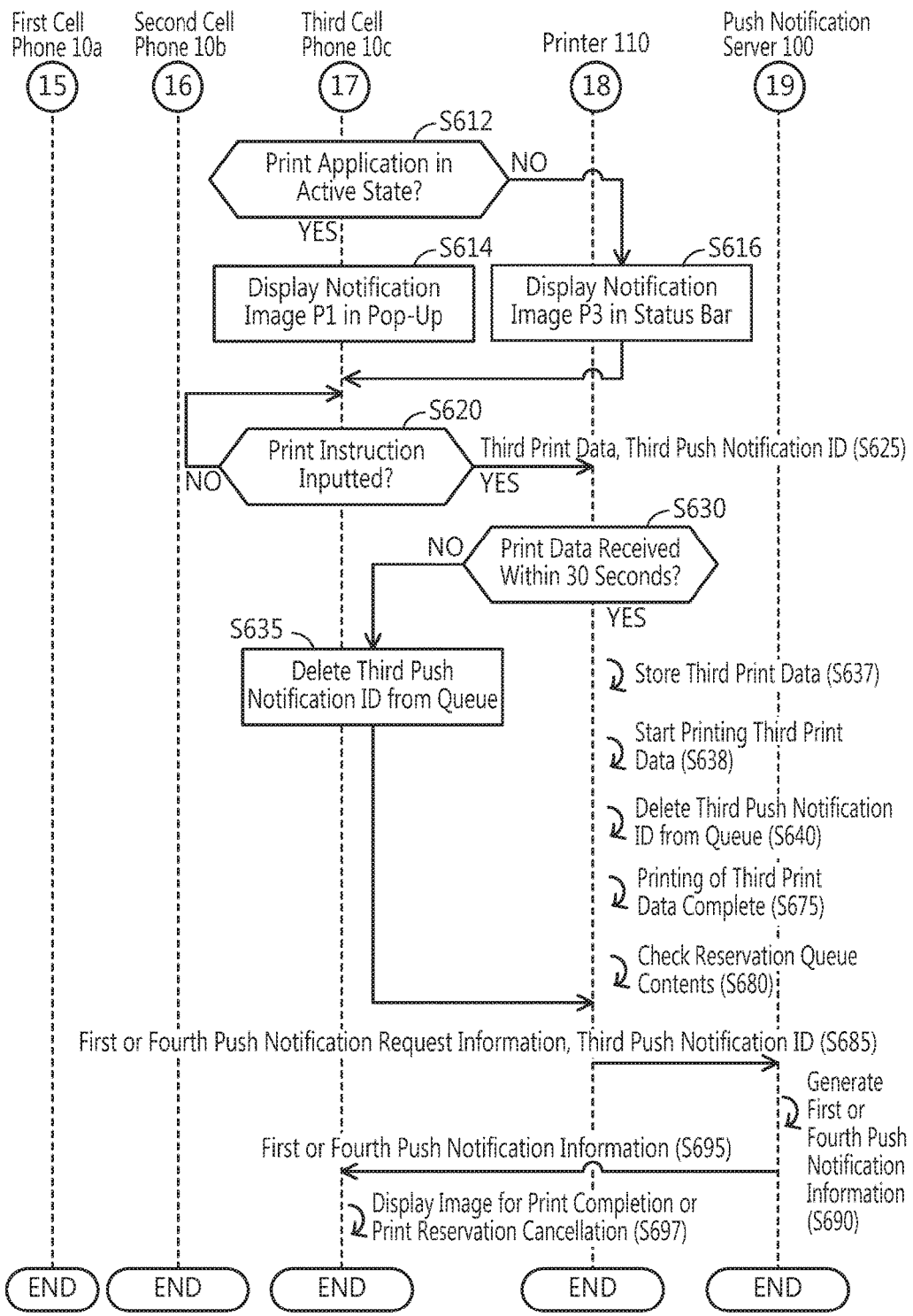
FIG. 6 shows a sequence diagram of the communication system of the first embodiment.

An operation of the communication system 1 of the first embodiment will be described with reference to sequence diagrams of FIGS. 2 to 6. Notably, a case where a particular event to be described later is not occurring in the printer 110 when the sequence diagram of FIG. 2 is started will be described.

In S100, the CPU 11 of the first cell phone 10a receives an input of an activation instruction of the print application 21a. For example, the input of the activation instruction may be received according to a touch input to an activation icon of the print application 21a displayed on the panel 18.

In S110, the CPU 11 of the first cell phone 10a activates the print application 21a. Due to this, a display screen for the print application 21a is displayed on a foreground of the panel 18. Further, in a case where the CPU 11 is executing another application (for example, the browser application 21b), a display screen for the other application is hidden in a background. Due to this, the print application 21a comes to be in an active state where it can receive inputs by the user. The print application 21a being in the active state can also be said as being a state in which the print application 21a is being executed with priority over the other application.

In S120, the first cell phone 10a receives a selection operation of a first print data. The first print data is a data indicating an image to be printed in the printer 110. The first print data may include print data for a plurality of pages.

In S130, the first cell phone 10a sends acquisition request information for a first push notification ID to the push notification server 100. The first push notification ID is identification information that is used to identify an external device (that is, the first cell phone 10a) to which the push notification server 100 should send the push notification information. Notably, various types of data and information are sent and received between the first cell phone 10a and the push notification server 100 through the wireless communication 221 and the Internet 70. The same applies to the respective steps to be described later.

In S140, the first cell phone 10a receives the first push notification ID from the push notification server 100. Further, the first cell phone 10a temporarily stores the received first push notification ID in the memory 12.

In S150, the user inputs first print instruction to the first cell phone 10a. For example, the first print instruction may be inputted by touching a button image of "print" included in the display screen for the print application 21a. In S160, the first cell phone 10a receives the input of the first print instruction.

In S170, the first cell phone 10a establishes a Wi-Fi communication in the infrastructure mode with the printer 110. That is, the first cell phone 10a and the printer 110 come to be in a state of being able to connect to each other wirelessly through the wireless communications 201 and 221.

In S180, the first cell phone 10a sends the first print data selected in S120 and the first push notification ID stored in S140 to the printer 110. Notably, various types of data and information are sent and received between the first cell phone 10a and the printer 110 by the wireless LAN_I/F 16 and the wireless LAN_I/F 118, and are performed through the wireless communications 201 and 221. The same applies to the respective steps to be described later.

In S185, the printer 110 determines whether or not a particular event where printing cannot be executed is occurring in the printer 110. As examples of the particular event, printing processing using the print execution unit 120, execution of a print reservation described herein, an insufficient capacity of the memory 134 and the like may be exemplified. A specific example for determining the occurrence of the particular event will be described. The printer 110 stores an event flag in the memory 134. The event flag is information indicating an event occurring in the printer 110. The printer 110 can determine whether or not an event is occurring by checking the event flag. Further, in a case where it is determined that an event is occurring, a determination can be made as to whether or not the occurring event is a particular event.

In the example in this embodiment, a case where no particular event is incurring in the printer 110 at its initial state is exemplified. In this case, the event flag indicates that none of the particular events is occurring. Thus, in S185, a determination is made that no particular event is occurring, so the process proceeds to S187.

In S187, the printer 110 stores the received first print data in the print data storage area 135. In S190, the printer 110 uses the first print data and prints in the print execution unit 120. Further, the printer 110 adds "Printing" to the contents of the event flag.

A time period from the start of the printing (S190) using the first print data sent from the first cell phone 10a to a completion of the printing (S400) will be termed "a first period T1". An operation in a case where second print data is sent from the second cell phone 10b during this first period T1 will be described using S230 to S285.

Contents of the respective steps of S230 to S255 regarding the second cell phone 10b become similar to contents of the respective steps of S130 to S180 regarding the first cell phone 10a by replacing the terms as follows. Thus, detailed description for the parts that are common between S230 to S255 and S130 to S180 will be omitted. Specifically, the replacement of the terms may be made as follows. The first push notification ID may be replaced with second push notification ID. The second push notification ID is identification information used for the push notification server 100 to identify the second cell phone 10b. The communication between the second cell phone 10b and the push notification server 100 is performed through a wireless communication 222 and the Internet 70. The first print data may be replaced with second print data. The second print data is data used in the printing in the printer 110, and is data selected by a user of the second cell phone 10b.

In S255, the second cell phone 10b sends the second print data and the second push notification ID to the printer 110. Notably, various types of data and information are sent and received between the second cell phone 10b and the printer 110 through the wireless communications 201 and 222. The same applies to the respective steps to be described later.

In S257, the printer 110 determines whether or not a particular event where the printing cannot be executed is occurring in the printer 110. Specifically, the printer 110 checks whether or not the contents of the event flag stored in the memory 134 contains "Printing" indicating that the printing is being executed, or "Print Reserved" indicating that a push notification ID is stored in the reservation queue storage area 136. In the example of the present embodiment, since "Printing" is included in the event flag, a determination is made as that the printing using the first print data is being executed. Thus, a determination is made that the particular event is occurring, and the process proceeds to S260.

In S260, the printer 110 sends Busy information back to the second cell phone 10b. The Busy information is information for notifying the second cell phone 10b that the particular event is occurring in the printer 110, and that the printing using the second print data cannot be executed due to the current occurrence of the particular event.

In S265, the second cell phone 10b sends second print reservation information and the second push notification ID to the printer 110. The second print reservation information is information for instructing to queue the second push notification ID in the printer 110. In other words, the second print reservation information is information for instructing the printer 110 to reserve printing using the second print data.

In S275, the printer 110 stores the second push notification ID received from the second cell phone 10b in the reservation queue storage area 136. Due to this, the reservation queue storage area 136 comes to be in a state where the second push notification ID is stored as a first reservation therein. Due to this, the print reservation for the second cell phone 10b is completed. Further, the printer 110 adds "Print Reserved" to the contents of the event flag.

In S277, the printer 110 generates standby status information. The standby status information is information for displaying an image indicating a standby status on a panel of the second cell phone 10b. The standby status includes a variety of information such as numbers of print reservations that are stored, which number the print reservation of the second cell phone 10b has therewithin, and the like. The standby status information is generated according to a state in which the push notification ID is stored in the reservation queue storage area 136. In the example of the present embodiment, the reservation queue storage area 136 stores the second push notification ID as the first reservation therein. Thus, the standby status information indicating that the print reservation of the second cell phone 10b is the first reservation is generated.

In S280, the printer 110 sends reservation completion information and the standby status information to the second cell phone 10b. The reservation completion information is information for notifying the second cell phone 10b that the print reservation of the second cell phone 10b has been completed by queuing the second push notification ID in the reservation queue storage area 136.

Figure 9:
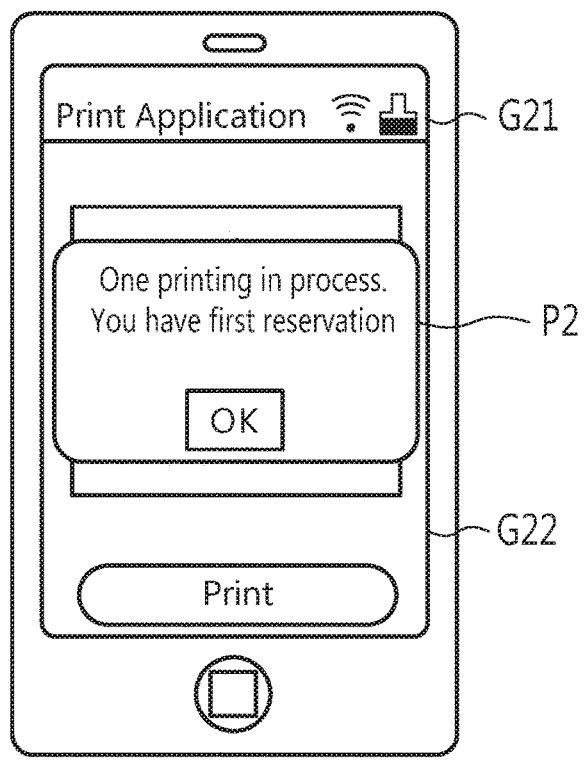
FIG. 9 shows an example of the notification screen and the display screen.

In S285, the second cell phone 10b displays a notification image P2 indicating the standby status on its panel. FIG. 9 shows a notification screen G21 and a display screen G22 that are displayed on the panel of the second cell phone 10b in S285. The notification screen G21 is a screen for displaying icon images indicating various notifications, such as signal intensity and battery indicators. The display screen G22 is a screen for displaying execution screens of various applications. The display screen G22 has a larger area size than the notification screen G21. As shown in FIG. 9, the display screen G22 includes a pop-up notification image P2. The notification image P2 is a screen for notifying the user that the printing is currently being executed in the printer 110, and that the print reservation of the second cell phone 10b is the first reservation.

An operation of a case where third print data is further sent from the third cell phone 10c during the first period T1 when the printing using the first print data is being executed will be described using S330 to S385.

Contents of the respective steps of S330 to S380 regarding the third cell phone 10c become similar to the contents of the respective steps of S230 to S280 regarding the second cell phone 10b by replacing the terms as follows. Thus, detailed description for the parts that are common between S330 to S380 and S230 to S280 will be omitted. Specifically, the replacement of the terms may be made as follows. The second push notification ID may be replaced with third push notification ID. The third push notification ID is identification information used for the push notification server 100 to identify the third cell phone 10c.

The communication between the third cell phone 10c and the push notification server 100 is performed through a wireless communication 223 and the Internet 70. The second print data may be replaced with third print data. The third print data is data used in the printing in the printer 110, and is data selected by a user of the third cell phone 10c.

In S355, the third cell phone 10c sends the third print data and the third push notification ID to the printer 110. Notably, various types of data and information are sent and received between the third cell phone 10c and the printer 110 through the wireless communications 201 and 223. The same applies to the respective steps to be described later.

In S357, the printer 110 determines whether or not a particular event where the printing cannot be executed is occurring in the printer 110. The specific contents of the determination are similar to the contents explained in the aforementioned S257. In the example of the present embodiment, "Printing" and "Print Reserved" are included in the event flag. Thus, a determination is made as that the printing using the first print data is being executed, and the printing using the second print data is on hold. Thus, a determination is made that the particular event is occurring, and the process proceeds to S360.

In S360, the printer 110 sends Busy information back to the third cell phone 10c. In S365, the third cell phone 10c sends third print reservation information and the third push notification ID to the printer 110. The third print reservation information is information for instructing to queue the third push notification ID in the printer 110. In S375, the printer 110 stores the third push notification ID received from the third cell phone 10c in the reservation queue storage area 136. Due to this, the reservation queue storage area 136 comes to be in a state where the second push notification ID is stored as the first reservation and the third push notification ID is stored as a second reservation. Due to this, the print reservation for the third cell phone 10c is completed.

In S377, the printer 110 generates standby status information. The contents of the standby status information have been explained in S277. In the example of the present embodiment, in S357 it is confirmed that the first push notification ID and the second push notification ID are stored in the reservation queue storage area 136. Thus, the standby status information indicating that the print reservation of the third cell phone 10c is the second reservation is generated.

In S380, the printer 110 sends reservation completion information and the standby status information to the third cell phone 10c. The reservation completion information is information for notifying the third cell phone 10c that the print reservation of the third cell phone 10c has been completed.

In S385, the third cell phone 10c displays a notification image P2 indicating the standby status on its panel. The specific display example of the notification image P2 has been explained in S285 and FIG. 9. In S385, the notification image P2 indicating that the print reservation of the third cell phone 10c is the second reservation is displayed. For example, the notification image P2 in FIG. 9 may display a content such as "2 printings are on hold. Your reservation is the second reservation."

In S400, the printer 110 completes the printing using the first print data, which was started in S190. Further, the printer 110 deletes "Printing" from the contents of the event flag. Due to this, the first period T1 ends.

In S410, the printer 110 checks the stored contents of the reservation queue storage area 136. In the example of the present embodiment, it is confirmed that the second push notification ID is stored first, and the third push notification ID is stored second.

In S420, the printer 110 sends first push notification request information and first push notification ID to the push notification server 100. The first push notification request information is information for requesting the push notification server 100 to send first push notification information to the cell phone identified by the incoming push notification ID. The first push notification request information is information that is generated in accordance with the determination in S400 that the printing using the first print data has been completed.

In S430, the push notification server 100 generates first push notification information. The first push notification information is a push notification that notifies that the printing has been completed. The first push notification information includes the first push notification ID received in S420. In S440, the push notification server 100 sends the generated first push notification information to the first cell phone 10a which the first push notification ID received in S420 indicates.

In S450, the first cell phone 10a displays an image indicating that the printing using the first print data has been completed in accordance with the received first push notification information on the panel 18. This image may be displayed as a pop-up similar to the aforementioned notification image P2, or may be displayed in an icon similar to a notification image P3 to be described later.

Further, in S410, the second cell phone 10b needs to be notified that its turn to print has arrived, since it has been confirmed that the second push notification ID is stored as the first reservation. Thus, in S500, the printer 110 sends second push notification request information and the second push notification ID to the push notification server 100.

In S505, the push notification server 100 generates second push notification information. The second push notification information is information for requesting the push notification server 100 to send the second push notification information to the cell phone identified by the incoming push notification ID. The second push notification information is information for notifying that its turn to execute the printing has arrived and information for requesting the print data to be sent to the printer 110. In other words, the second push notification request information is information for asking the push notification server 100 to notify the cell phone identified by the push notification ID stored as the first reservation in the reservation queue storage area 136 that it turn to execute the printing has arrived, in the form of push notification. The second push notification information includes the second push notification ID received in S500.

In S510, the push notification server 100 sends the generated second push notification information to the second cell phone 10b which the second push notification ID received in S500 indicates.

In S512, the second cell phone 10b determines whether or not the print application operating on the second cell phone 10b is in an active state. Specifically, a determination is made as to whether a display screen of the print application is being displayed in the foreground or in the background. For example, in a case where the second cell phone 10b is installed with Android (registered trademark of Google Inc.) OS, states of the respective applications are managed in a process list. The process list includes information on status as to whether the respective applications are displayed in the foreground or the background. Thus, the second cell phone 10b can determined whether or not the print application is in the active state by using the process list. In a case where the display screen of the print application is displayed in the foreground, it is determined that the print application is in the active state (S512: YES), and the process proceeds to S514.

Figure 7:
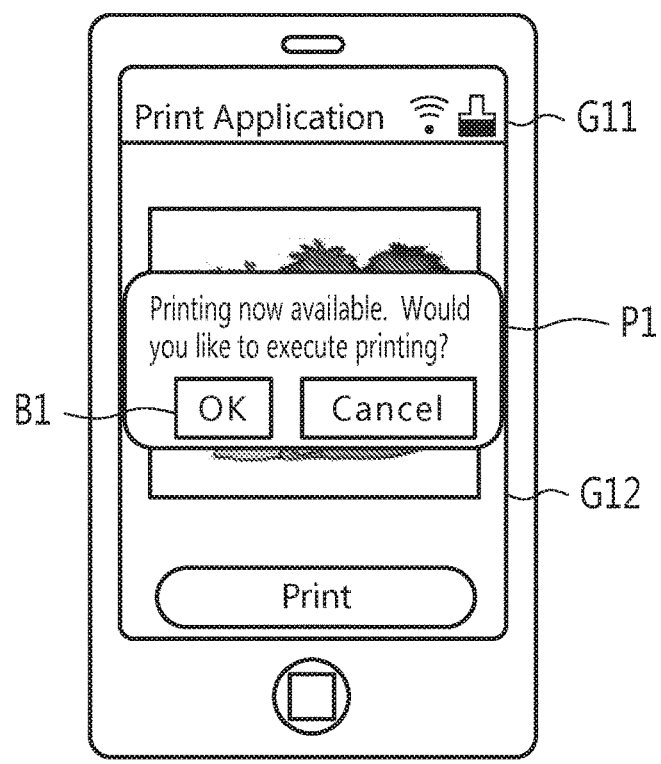
FIG. 7 shows an example of a notification screen and a display screen.

In S514, the second cell phone 10b displays a notification image P1 on the panel. The notification image P1 in FIG. 7 is an image for notifying the user that the printing is now available in the printer 110, and is for receiving a selection on whether or not to send the print data to the printer 110. FIG. 7 shows a notification screen G11 and a display screen G12 that are displayed on the panel in S514. The notification screen G11 is a screen for displaying icon images indicating various notifications, such as signal intensity and battery indicators. The display screen G12 is a screen for displaying execution screens of various applications. The display screen G22 has a larger area size than the notification screen G21. As shown in FIG. 7, the display screen G12 includes a pop-up notification image P1.

On the other hand, in a case where the display screen of the print application is hidden in the background, it is determined that the print application is not in the active state (S512: NO), and the process proceeds to S516. An example of the case where a negative determination is made in S512 may be a case where an activation instruction for another application has been inputted to the second cell phone 10b.

Figure 8:
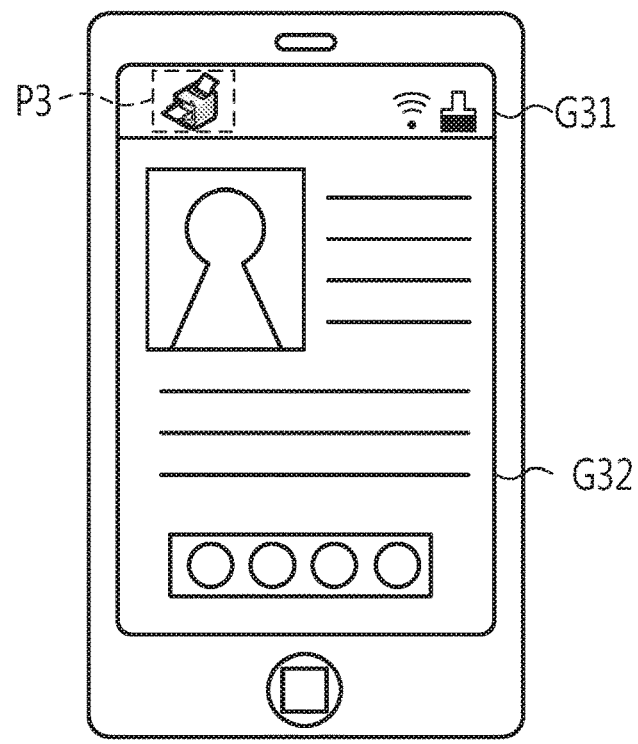
FIG. 8 shows an example of the notification screen and the display screen.

In S516, the second cell phone 10b displays a notification image P3 on the panel. Contents of the notification image P3 are similar to the contents of the aforementioned notification image P1. FIG. 8 shows an example of a notification screen G31 and a display screen G32 that are displayed on the panel in S516. The display screen G32 is a screen displayed by the other application aside from the print application. The notification screen G31 includes an icon notification image P3. The icon notification image P3 is an image that is smaller than the pop-up notification image P1. When a tap operation is inputted to the notification image P3, the notification image P1 shown in FIG. 7 may be displayed.

In S520, the second cell phone 10b determines whether or not a print instruction has been inputted. Specifically, a determination is made as to whether or not an OK button B1 indicated in the notification image P1 of FIG. 7 has been tapped. In a case where a negative determination is made (S520: NO), the process returns to S520, and in a case where an affirmative determination is made (S520: YES), the process proceeds to S525. In S525, the second cell phone 10b sends second print data and second push notification ID to the printer 110.

In S530, the printer 110 determines whether or not the second print data has been received from the second cell phone 10b in S525 within 30 seconds since the time when the second push notification request information and the second push notification ID were sent to the push notification server 100. In a case where a negative determination is made (S530: NO) the process proceeds to S535. In S535, the printer 110 deletes the second push notification ID from the reservation queue storage area 136. Further, the stored order of the third push notification ID is moved up from the second to first reservation. Due to this, the print reservation of the second cell phone 10b can be cancelled. Further, the order of the print reservation of the third cell phone 10c can be moved up by one. Then, the process proceeds to S585.

On the other hand, in a case where an affirmative determination is made in S530 (S530: YES), the process proceeds to S537. In S537, the printer 110 stores the second print data received in S525 in the print data storage area 135. In S538, the printer 110 executes the printing using the second print data in the print execution unit 120. Further, the printer 110 adds "Printing" to the contents of the event flag.

In S540, the printer 110 deletes the second push notification ID from the reservation queue storage area 136 when the printing is started in S538. Further, the stored order of the third push notification ID is moved up from the second to first reservation. Due to this, a circumstance in which overlapping printing is executed for the second push notification ID can be prevented.

In S540, since the stored order of the third push notification ID has been moved up to first, the third cell phone 10c needs to be notified that the print execution order has been moved up. Thus, in S545, the printer 110 sends third push notification request information and the third push notification ID to the push notification server 100.

In S550, the push notification server 100 generates third push notification information. The third push notification request information is information for requesting the push notification server 100 to send the third push notification information to the cell phone identified by the incoming push notification ID. The third push notification information is information including at least one of: one printing has been completed, its turn to print has not yet arrived, a number of jobs pending in the print reservations, and the like. In other words, the third push notification request information is information for requesting the push notification server 100 to notify the cell phone, which was stored in the reservation queue storage area 136 as second or subsequent reservation, and which has its printing order just moved up as of now, the order of the print reservation and the like by using a push notification. The third push notification information includes the third push notification ID received in S545.

In S555, the push notification server 100 sends the generated third push notification information to the third cell phone 10c indicated by the third push notification ID received in S545.

In S560, the third cell phone 10c determines whether or not the print application operating on the third cell phone 10c is in the active state. Specific contents of this determination have already been explained in S512, so the description thereof will herein be omitted. In a case where an affirmative determination is made (S560: YES), the process proceeds to S562. In S562, the third cell phone 10c displays a notification image P2 in a pop-up as shown in FIG. 9. Contents of FIG. 9 and the notification image P2 have already been explained in S285.

Figure 10:
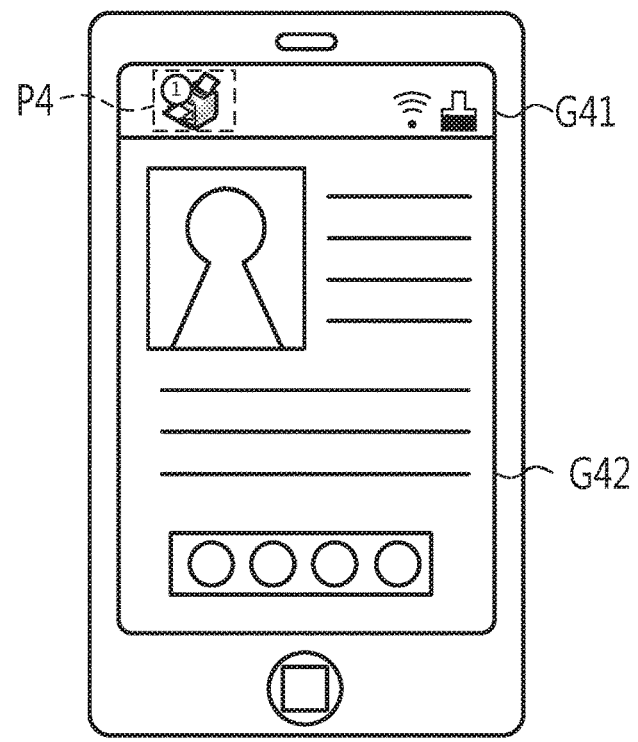
FIG. 10 shows an example of the notification screen and the display screen.

On the other hand, in a case where a negative determination is made in S560 (S560: NO), the process proceeds to S564. In S564, the third cell phone 10c displays a notification image P4 on the panel. The notification image P4 of FIG. 10 is an image for notifying a user of a number of print reservation having higher order than the print order of the third cell phone 10c. FIG. 10 shows an example of a notification screen G41 and a display screen G42 that are displayed on the panel of the third cell phone 10c in S564. Contents of the notification screen G41 and the display screen G42 are similar to those of the notification screen G31 and the display screen G32 aforementioned in S516. The notification screen G41 includes an icon notification image P4. When a tap operation is inputted to the notification image P4, the notification image P2 shown in FIG. 9 may be displayed in a pop-up.

In S575, the printer 110 completes the printing using the second print data. Further, the printer 110 deletes "Printing" from the contents of the event flag. In S580, the printer 110 checks the stored contents of the reservation queue storage area 136. In the example of the present embodiment, it is confirmed that the third push notification ID is stored as the first reservation therein.

In S585, the printer 110 sends first push notification request information or fourth push notification request information together with a second push notification ID to the push notification server 100. In the case where the affirmative determination is made in S530, the first push notification request information is sent in S585. On the other hand, in the case where the negative determination is made in S530 and the second push notification ID was deleted from the reservation queue storage area 136 in S535, the fourth push notification request information is sent in S585. The contents of the first push notification request information and the first push notification information are already explained in S420. The fourth push notification request information is information for requesting the push notification server 100 to send fourth push notification information to the second cell phone 10b identified by the second push notification ID. The fourth push notification information is a push notification notifying that the print reservation has been cancelled. The fourth push notification information includes the second push notification ID received in S585.

In S590, the push notification server 100 generates first push notification information in a case of receiving the first push notification request information, and generates fourth push notification information in a case of receiving the fourth push notification request information. In S595, the push notification server 100 sends the first push notification information or the fourth push notification information to the second cell phone 10b which the second push notification ID received in S585 indicates.

In S597, the second cell phone 10b displays an image indicating that the printing using the second print data has been completed on the panel 18 when the first push notification information has been received. On the other hand, when the fourth push notification information has been received, it displays an image indicating that the print reservation using the second print data has been cancelled on the panel 18.

Further, in S580, since it has been confirmed that the third push notification ID is stored as the first reservation, the third cell phone 10c needs to be notified that its turn to print has arrived. Thus, in S600, the printer 110 sends second push notification request information and the third push notification ID to the push notification server 100. Contents of the second push notification request information have already been explained in S500.

In S605, the push notification server 100 generates the second push notification information indicating that its turn to execute the printing has arrived. The second push notification information includes the third push notification ID received in S600. In S610, the push notification server 100 sends the second push notification information to the third cell phone 10c which the third push notification ID received in S600 indicates.

Contents of the respective steps of S612 to S640 and S675 to S680 regarding the third cell phone 10c become similar to contents of the respective steps of S512 to S540 and S575 to S580 regarding the second cell phone 10b by replacing the terms. Thus, detailed description for the parts that are common between S612 to S640, S675 to S680 and S512 to S540, S575 to S580 will be omitted. Specifically, the replacement of the terms may be made as follows. The second print data may be replaced with the third print data. The second push notification ID may be replaced with the third push notification ID. In S625, the third cell phone 10c sends the third print data and the third push notification ID to the printer 110. In S638, the printer 110 executes printing using the third print data in the print execution unit 120. Further, the printer 110 adds "Printing" to the contents of the event flag.

In S675, the printer 110 completes the printing using the third print data. Further, the printer 110 deletes "Printing" from the contents of the event flag. In S680, the printer 110 checks the stored contents of the reservation queue storage area 136. In the example of the present embodiment, it is confirmed that no other push notification ID is stored. Further, the printer 110 deletes "Print Reserved" from the contents of the event flag.

In S685, the printer 110 sends the first push notification request information or the fourth push notification request information together with the third push notification ID to the push notification server 100. In a case where an affirmative determination is made in S630, the first push notification request information is sent. On the other hand, in a case where a negative determination is made in S630 and the third push notification ID is deleted from the reservation queue storage area 136 in S635, the fourth push notification request information is sent in S685. Contents of the fourth push notification request information and the fourth push notification information have already been explained in S530.

In S690, the push notification server 100 generates first push notification information when the first push notification request information has been received, and generates fourth push notification information when the fourth push notification request information has been received. In S695, the push notification server 100 sends first push notification information or fourth push notification information to the third cell phone 10c indicated by the third push notification ID received in S685. In S697, the third cell phone 10c displays an image indicating that the printing using the third print data has been completed on the panel when the first push notification information has been received. On the other hand, when the fourth push notification information has been received, it displays an image indicating that the print reservation using the third print data has been cancelled on the panel. Then, the process flow is completed.

Effects of First Embodiment

A case where the printer 110 is to execute print processing by sending the second print data to the printer 110 using the print application executed in the second cell phone 10b will be assumed. In sending the second print data, there is a case where a particular event where the printing cannot be executed may be occurring in the printer 110. As an example of the particular event, the printing of the first print data sent from the first cell phone 10a may be exemplified. Further, there may be a case where the second print data cannot be queued in the printer 110. For example, a case where the printer 110 is not compatible with the queuing of print data sent from cell phones, a case where an available capacity in the print data storage area 135 of the printer 110 is insufficient, and the like. In such cases, the second print data needs to be re-sent to the printer 110 according to the completion of the print processing in the printer 110. Due to this, the completion of the print processing in the printer 110 needs to be detected on a second cell phone 10b side. However, in order to detect the completion of the printing in the printer 110 on the second cell phone 10b side, the print application needs to be maintained in the active state in the second cell phone 10b. In other words, a screen of the print application needs to be kept displayed on the foreground. In so doing, other application (for example, the browser application) cannot be displayed on the foreground and be used until when the completion of the printing in the printer 110 is detected. That is, a restriction will be imposed on the execution of the other application on the second cell phone 10b until the completion of the print processing using the print application. Since the second cell phone 10b is on the premise of being used while switching among a plurality of applications, an operability of the second cell phone 10b is thereby failed to a great extent.

According to the technique described herein, in the event where the particular event is occurring in the printer 110, the second push notification ID, which is the information for identifying the second cell phone 10b, can be queued in the printer 110 (S275). Since the second push notification ID has a smaller data size compared to the second print data, it would not impose much burden on the capacity of the memory 134 of the printer 110. Further, when the particular event is ended, the second push notification information indicating that the particular event has ended can be sent from the printer 110 to the second cell phone 10*b* through the push notification server 100 by push notification (S510). The second push notification information is information that can be received even in the state where the print application is not activated in the second cell phone 10*b*. Thus, the state in which the screen of the print application is being displayed in the foreground does not need to be maintained for the detection of the completion of the particular even in the printer 110. Due to this, no restriction will be imposed on the execution of the other application on the second cell phone 10*b*, so the situation where the operability of the second cell phone 10*b* is failed can be prevented. Further, since it becomes possible to perform the print reservation (S275) when the particular event is occurring in the printer 110 and automatically print (S538) that had been reserved when the particular event is ended, convenience for the user can be improved.

In a case where one or more push notification IDs are stored in the reservation queue storage area 136 (S357) when print data is sent from a cell phone to the printer 110 (S355), a determination can be made that preceding print reservations are present. In this case, the subsequent print reservation can be made by storing (S375) the push notification ID of the cell phone that had sent the print data in the reservation queue storage area 136. Further, when the printings reserved by the preceding print reservations are finished (S575), the push notification information indicating that its turn to print has arrived can be sent from the printer 110 to the cell phone that had made the subsequent print reservation through the push notification server 100 by push notification (S610). Due to this, it becomes possible to receive (S625) the print data from the cell phone that had made the subsequent print reservation and print (S670). Due to this, it becomes possible to orderly execute a plurality of print reservations, and the convenience for the user can be improved.

In the case where such a plurality of push notification IDs is queued in the printer 110, the cell phone to which its turn for printing has arrived can be notified of such an arrival of its printing turn by push notification (S440). Further, in the case where the print data was not sent from the cell phone to which the printing turn has arrived within a predetermined period after the notification (for example, 30 seconds) (S530: NO), the print reservation of this cell phone can be cancelled by deleting the push notification ID of the cell phone from the reservation queue storage area 136 (S535). Further, the push notification information indicating that the print reservation has been cancelled can be sent from the printer 110 to the cell phone through the push notification server 100 by push notification (S585). Due to this, it becomes possible to surely notify the user that the print reservation has been cancelled. Further, when second and subsequent print reservations are on hold under the situation where the first print reservation is cancelled, the order of the second and subsequent print reservations can be moved up by one each (S535). Due to this, the cell phone that has the print reservation that has newly become the first one can be notified that its turn to print has arrived by push notification (S610). As above, a plurality of print reservations can be processed within a short period of time without stalls.

The cell phone that received the push notification notifying that the reserved printing can now be executed (S510) can display, on the panel of the cell phone, the image for receiving the selection on whether or not to send the print data to the printer 110 (S514, S516). Further, on condition that the print instruction has been inputted (S520: Y), the print data can be sent to the printer 110 (S525). Due to this, a situation in which the printing being executed against the user's will can be prevented.

In the case where the screen of the print application is displayed on the foreground (S512: YES) when the push notification is given from the push notification server 100 to the cell phone (S510), the pop-up notification image can be displayed on the panel (S514). Due to this, the fact that the reserved printing can now be executed can surely be notified to the user. Further, in the case where the screen of the print application is hidden in the background (S512: NO), the icon notification image can be displayed on the panel (S516). Due to this, the display of the notification image will not interfere with the user's operation even in the case where the user is operating other application. From the above, a suitable notification can be selected according to whether or not the print application is in the active state in the cell phone.

Second Embodiment

A second embodiment is an embodiment that uses the same communication system 1 as the first embodiment. Further, in the second embodiment, a configuration in which the push notification information having the same contents is simultaneously sent to all of the first cell phone 10*a* to third cell phone 10*c*, and each of the first cell phone 10*a* to third cell phone 10*c* analyzes the contents of the push notification information will be described.

Figure 11:
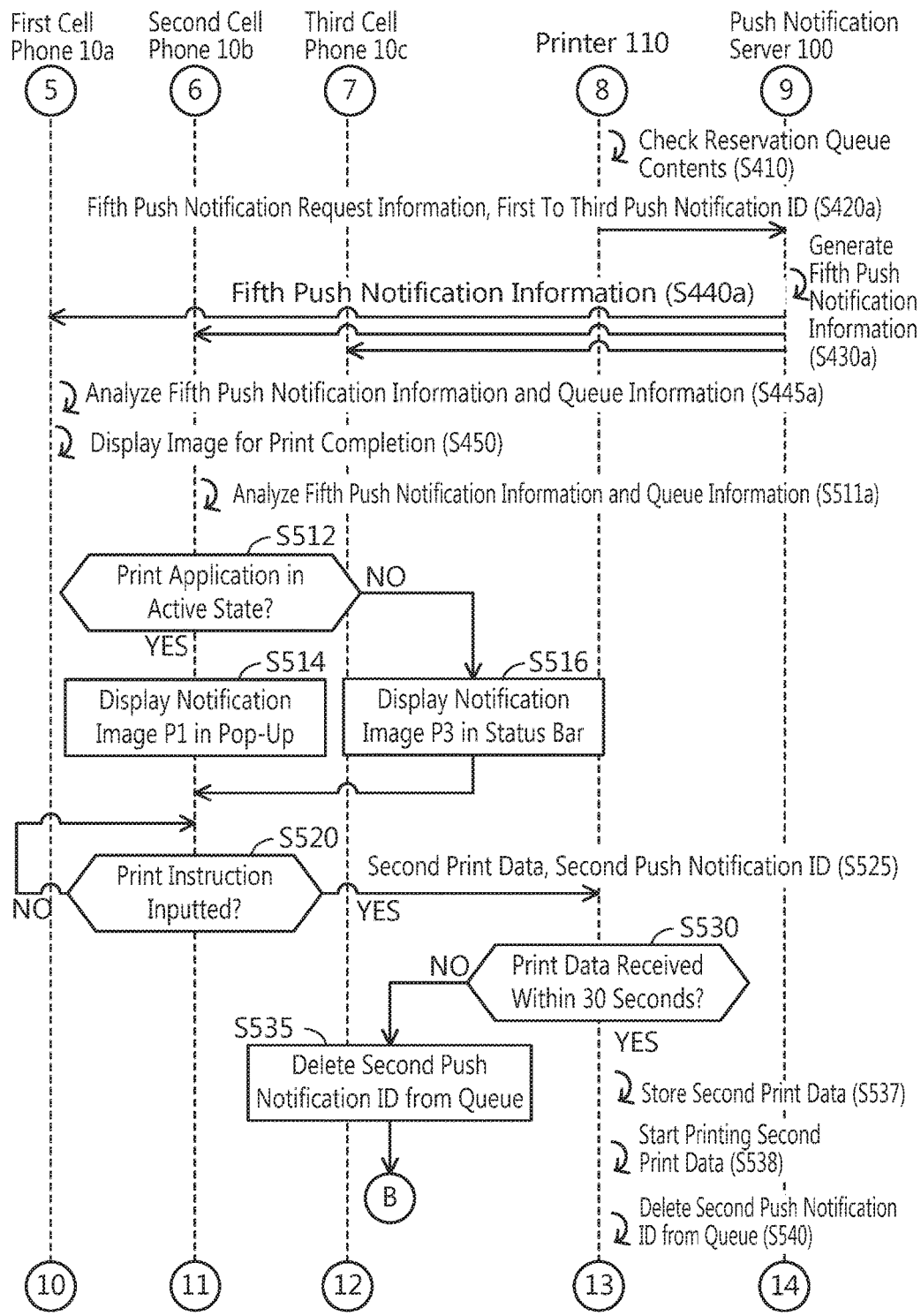
FIG. 11 shows a sequence diagram of a communication system of a second embodiment.
Figure 12:
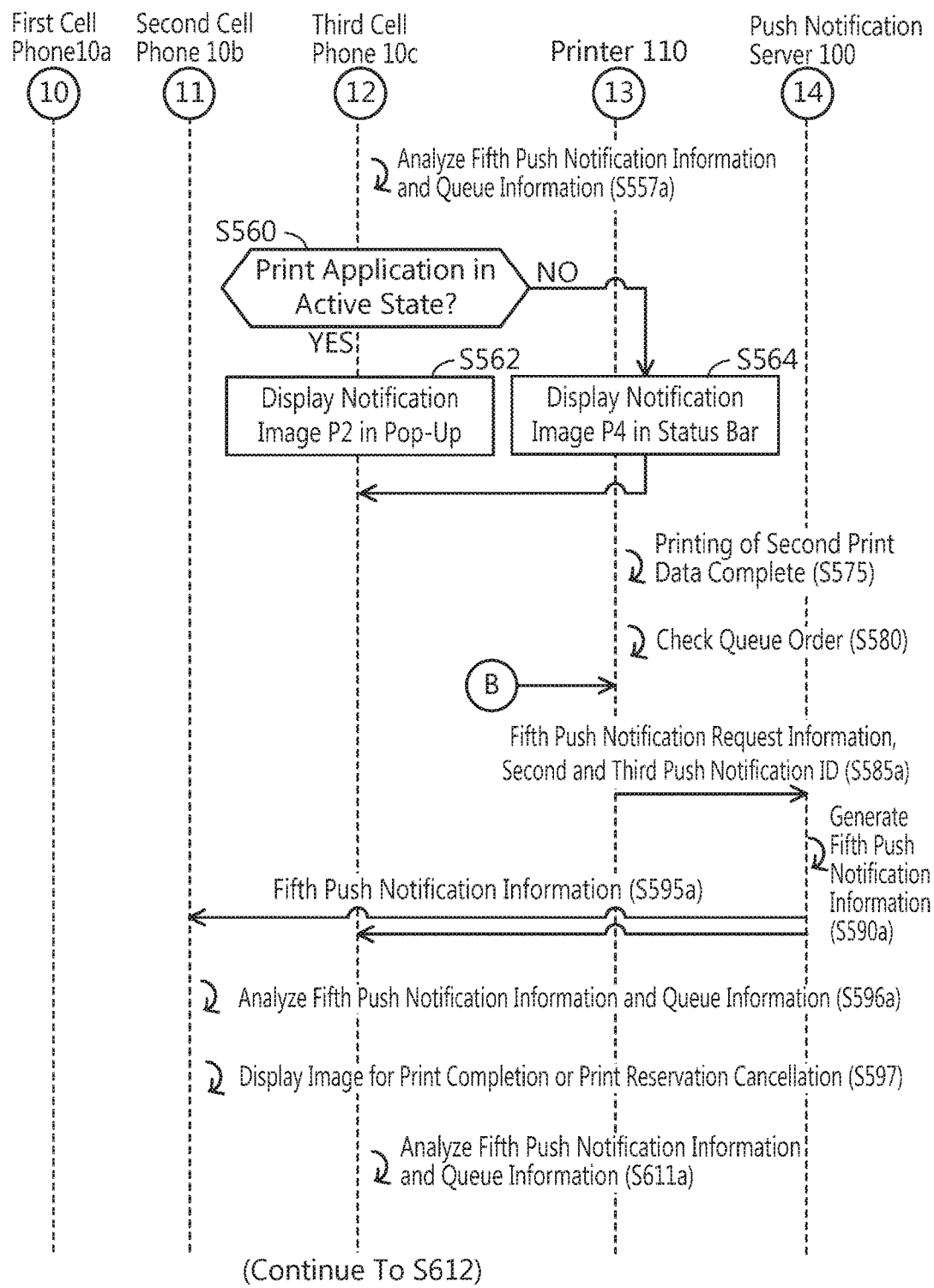
FIG. 12 shows a sequence diagram of the communication system of the second embodiment.

An operation of the communication system 1 of the second embodiment 2 will be described with reference to sequence diagrams of FIG. 11 and FIG. 12. The contents of the sequences preceding FIG. 11 have already been described in FIGS. 2 and 3. Among the steps included in FIG. 11 and FIG. 12 and the steps included in FIG. 4 and FIG. 5, contents of the steps having the same reference signs are identical, unless otherwise mentioned. Thus, the description may be omitted. Further, hereinbelow, steps unique to the second embodiment will mainly be described. Notably, for the reference signs of the steps unique to the second embodiment are given "a" at the end thereof.

In S410, the printer 110 checks the stored contents of the reservation queue storage area 136. In the example of the present embodiment, it is confirmed that the second push notification ID is stored as the first reservation, and the third push notification ID is stored as the second reservation. In S420*a*, the printer 110 sends fifth push notification request information and the first to third push notification IDs to the push notification server 100. The fifth push notification request information is information for requesting the push notification server 100 to send fifth push notification information to the cell phones identified by the incoming push notification IDs.

In S430*a*, the push notification server 100 generates fifth push notification information. The fifth push notification information includes queue information. The queue information is information indicating the stored order of the plurality of push notification IDs queued in the reservation queue storage area 136 of the printer 110. In other words, the queue information is information indicating the order of the print reservations and jobs for which printing has been completed. The queue information may include an entire list structure that is stored in the reservation queue storage area 136. In the example of the present embodiment, the queue information indicates that the second push notification ID is queued first, and the third push notification ID is queued second.

In S440a, the push notification server 100 simultaneously sends the fifth push notification information to the first cell phone 10a to third cell phone 10c.

The operation of the first cell phone 10a will be described using S445a and S450. In S445a, the first cell phone 10a analyzes the fifth push notification information and the queue information. The queue information does not include the first push notification ID identifying the first cell phone 10a. Thus, the first cell phone 10a can determine that the printing using the first print data has been completed. Thus, in S450, the first cell phone 10a displays the image indicating the print completion on the panel 18. The fifth push notification information is information including at least one of "information notifying that the printing using the first print data has been completed", "information for notifying the second cell phone 10b that its turn for print execution has arrived, and information for requesting the second cell phone 10b to send the print data to the printer 110", and "information for notifying the third cell phone 10c that one printing has been completed but its turn for print execution has not yet arrived, and notifying the third cell phone 10c of the number of jobs on hold in the print reservations". The fifth push notification information includes the first to third push notification IDs received in S420a.

The operation of the second cell phone 10b will be described using S511a to S540. In S511a, the second cell phone 10b analyzes the fifth push notification information and the queue information. The queue information indicates that the second push notification ID identifying the second cell phone 10b is queued first. Thus, the second cell phone 10b can determine that the print execution turn for the second cell phone 10b has arrived. Further, the contents of the fifth push notification information have already been explained in S445a. Thus, the second cell phone 10b executes the processes of S512 to S540. Due to this, the second print data and the second push notification ID can be sent to the printer 110 (S525).

The operation of the third cell phone 10c will be described using S557a to S611a. In S557a, the third cell phone 10c analyzes the fifth push notification information and the queue information. The queue information indicates that the third push notification ID identifying the third cell phone 10c is queued second. Thus, the third cell phone 10c can determine that currently the printer 110 is printing, and that the print reservation of the third cell phone 10c is the first reservation. Further, the contents of the fifth push notification information have already been explained in S445a. Thus, the third cell phone 10c executes the processes of S560 to S580.

In S585a, the printer 110 sends the fifth push notification request information and the second and third push notification IDs to the push notification server 100. In S590a, the push notification server 100 generates fifth push notification information including the queue information. In the case where the negative determination is made in S530 and the second push notification ID was deleted from the reservation queue storage area 136 in S535, the push notification server 100 includes cancel information indicating that the print reservation of the second cell phone 10b has been cancelled in the fifth push notification information. In the example of the present embodiment, the queue information indicates that the third push notification ID is queued first. In S595a, the push notification server 100 simultaneously sends the fifth push notification information to the second cell phone 10b and the third cell phone 10c.

In S596a, the second cell phone 10b analyzes the fifth push notification information and the queue information received in S595a. The queue information does not include the second push notification ID identifying the second cell phone 10b. Thus, when the cancel information of the second cell phone 10b is not included in the fifth push notification information, the second cell phone 10b can determine that the printing using the second print data has been completed. Thus, in S597, the second cell phone 10b displays the image indicating the print completion on the panel 18. On the other hand, when the cancel information of the second cell phone 10b is included in the fifth push notification information, it can be determined that the printing using the second print data has been cancelled. Thus, in S597, the second cell phone 10b displays the image indicating the cancellation of the print reservation on the panel 18.

In S611a, the third cell phone 10c analyzes the fifth push notification information and the queue information received in S595a. The queue information indicates that the third push notification ID identifying the third cell phone 10c is queued first. Thus, the third cell phone 10c can determine that the print execution turn for the third cell phone 10c has arrived. Thus, the third cell phone 10c executes the processes of S612 and its subsequent steps. The contents of the steps of S612 and thereafter have already been explained using FIG. 6.

Effects of Second Embodiment

According to the above configuration, in the case where a plurality of print reservations is queued in the printer 110 by the first cell phone 10a to third cell phone 10c, the fifth push notification information including the queue information can be sent simultaneously to the first cell phone 10a to third cell phone 10c (S440a). Each of the first cell phone 10a to third cell phone 10c analyzes the fifth push notification information and the queue information (S445a, S511a, S557a) so that it can confirm the execution states of the respective print reservations. Since the contents of the push notification do not have to be customized for each of the first cell phone 10a to third cell phone 10c, the process load on the push notification server 100 can be reduced.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

(Modifications)

The print data was sent to the printer 110 (S525, S625) on condition that the print instruction is inputted in S520 and S620, however, no limitation is made to this configuration. The print data may be sent to the printer 110 when the push notification information indicating that the printing turn has arrived is received (S510, S610). Due to this, the necessity for the user to input the print instruction can be omitted. Thus, the reserved printing can be printed automatically.

The display configuration of the notification image P1 displayed in S514 and S614 is not limited to pop-ups as shown in FIG. 7. It may have a variety. For example, a part of the display screen G12 may be provided with an area for displaying the notification image P1. Further, the notification image P1 may display status of the print reservation, such as stand-by, printable, printing, print completed, and the like.

The display configuration of the notification image P2 displayed in S285 and S562 is not limited to pop-ups as shown in FIG. 9. It may have a variety. For example, a part of the display screen G22 may be provided with an area for displaying the notification image P2. Further, the notification image P2 may display status of the print reservation, such as stand-by, printable, printing, print completed, and the like.

In the present embodiments, the configuration in which the device identifying information identifying the cell phone is queued in the reservation queue storage area 136 (S275, S375) has been described. That is, the configuration in which the device identifying information is used as the information for identifying the print job. Further in the present embodiment, the configuration that uses the push notification ID as the device identifying information has been described. However, the device identifying information may be various types of information. For example, the printer 110 that had received the print reservation information (S265, S365) may generate a job ID identifying the print job and the cell phone. Further, the job ID may be queued in the reservation queue storage area 136 (S275, S375). Further, the reservation completion information and the generated job ID may be sent to the cell phone (S280, S380). When the printing is completed, the push notification information and the job ID may be sent to the cell phone (S440, S510, S555). Due to this, the cell phone can recognize the status of the print job using the job ID.

Further, the device identifying information may change in the midst of the sequence. Hereinbelow a sequence example is shown. The printer 110 receives the push notification ID as the device identifying information (S255, S355). The printer 110 generates a job ID identifying the print job and the cell phone. Further the generated job ID is stored in the reservation queue storage area 136 as the device identifying information (S275, S375). That is, any type of information may be used as the device identifying information so long as the information can identify the cell phone.

In the list structure of the reservation queue storage area 136 of the present embodiments, when the printing is started (S538, S638), the configuration in which the push notification ID related to the printing that has started is deleted from the queue (S540, S640) has been described. That is, the configuration in which the push notification ID corresponding to the job for which the printing is being executed is not stored in the reservation queue storage area 136 has been described. However, no limitation is made to this configuration. The push notification ID related to the printing that has been completed may be deleted from the queue when the printing is completed (S575, S675). That is, the push notification ID corresponding to the job for which the printing is being executed may be stored as the first item in the reservation queue storage area 136.

Timing at which the push notification ID is deleted from the reservation queue storage area 136 (S540, S640) may be set arbitrarily. For example, it may be deleted when the received print data is stored in the print data storage area 135 (S537, S637).

The step of S260 to send the Busy information, and the step of S265 to send the second print reservation information and the second push notification ID may be omitted. In this case, the sequence may be changed as follows. When it is determined that the particular event is occurring in the printer 110 in S257, the process may proceed to S275. In S280, when the reservation completion information is received, the second cell phone 10b executes a transmission standby processing for the second print data. The transmission standby processing is a processing to store information instructing the transmission of the second print data to the printer 110 to take place when the second push notification information (S510) is received from the push notification server 100 in a later process. Notably, the steps of S360 and S365 may be omitted likewise.

In S500, the second push notification request information may include a terminal ID for identifying the second cell phone 10b, and an application information ID for identifying the print application operating on the second cell phone 10b. In S510, the second push notification information as well as the terminal ID and the application information ID may be sent to the second cell phone 10b. In S512, the second cell phone 10b may determine whether or not the application identified by the received application information ID is in the active state. Notably, the third push notification request information in S545 may similarly include a terminal ID for identifying the third cell phone 10c, and an application information ID for identifying the print application operating on the third cell phone 10c.

In the present embodiments, the case where the print reservations are made from three cell phones, namely the first cell phone 10a to the third cell phone 10c, has been described, however, no limitation is made to this configuration. The technique described in the embodiments may be adapted even to cases where the print reservations are made from four or more cell phones.

The predetermined waiting time in S530 and S630 is not limited to 30 seconds, but may freely be set according to communication speed, and a degree of traffic in the push notification server 100.

In the present embodiments, the case where the communication between the first cell phone 10a and the push notification server 100 is performed through the wireless communication 221 facilitated by the wireless LAN_I/F 16 and the Internet 70 has been described, however, no limitation is made hereto. The communication between the first cell phone 10a and the push notification server 100 may be performed through the wireless communication 221 facilitated by the cell phone interface 22 and the Internet 70. The same applies to the second cell phone 10b and the third cell phone 10c.

The steps of S285, S385, S514, S516, S562, S564, S597, S614, S616, S697 and the like in the first embodiment for displaying various images may be omitted. From the above, in general, the printer 110 simply needs to function at least to perform "first-receiving", "determining", "first-storing", "second-storing", "sending", "second-receiving", "third-storing" and "executing". Specifically, the printer 110 at least needs to execute S180, S185 or S257 or S357, S187, S275 or S375, S500 or S600, S525 or S625, S537 or S637, and S190 or S538 or S638.

The printer 110 and the first cell phone 10a to third cell phone 10c may perform wired communications instead of performing the wireless communications. In general, the first cell phone 10a to third cell phone 10c and the printer 110 simply need to be capable of communicating with each other.

In a case where the first cell phone 10a to third cell phone 10c are in a wired connection to the Internet 70, the communication with the push notification server 100 may be performed by the wired communication. In general terms, the first cell phone 10a to third cell phone 10c and the push notification server 100 simply need to be capable of communicating with each other.

In a case where the printer 110 is in a wired connection to the Internet, communication with the push notification server 100 for various types of information may be performed by a wired communication. In general terms, the printer 110 and the push notification server 100 simply need to be capable of communicating with each other.

The push notification server 100 does not need to be a single server, and it may be a plurality of servers configured separately.

A device on which the print application 21a operates does not have to be the first cell phone 10a to third cell phone 10c, and it may be a tower-type PC, or other devices (such as TV, etc.).

In the respective embodiments as above, the respective processing in FIGS. 2 to 6, etc. is realized by the CPU 132 of the printer 110 and the CPUs of the first cell phone 10a to third cell phone 10c executing programs. Instead of this, at least one of the processing among those in FIGS. 2 to 6 may be realized by a hardware, such as a logical circuit.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

The first cell phone 10a to third cell phone 10c are examples of an information processing device. The wireless LAN interface 118 is an example of a communication interface. The printer 110 is an example of an image processing device. The push notification ID is an example of a device identifying information. The CPU executing S180 is an example of "first-receiving". The CPU executing S185, S257, S357 is an example of "determining whether or not a particular event is occurring in the image processing device". The CPU executing S187 is an example of "first-storing". The CPU executing S275, S375 is an example of "second-storing". The CPU executing S500, S600 is an example of "sending the device identifying information to the push notification server". The CPU executing S525, S625 is an example of "second-receiving". The CPU executing S537, S637 is an example of "third-storing". The CPU executing S190, S538, S638 is an example of "executing printing". The CPU executing S540, S640 is an example of "deleting the device identifying information". The CPU executing S420 is an example of "sending first device identifying information". The CPU executing S525 is an example of "receiving second print data from the second information processing device". The CPU executing S538 is an example of "executing printing using the received second print data". The Busy information is an example of first information. The print reservation information is an example of second information. The CPU executing S260 is an example of "sending first information to the second information processing device". The CPU executing S585 is an example of "sending the second device identifying information". The CPU executing S625 is an example of "receiving third print data from the third information processing device". The CPU executing S638 is an example of "executing printing using the received third print data". The CPU executing S535 is an example of "deleting the second device identifying information". The CPU executing S600 is an example of "sending the third device identifying information".

The push notification ID is an example of first device identifying information. The CPU executing S140 is an example of "receiving first device identifying information". The CPU executing S150 is an example of "accepting an input of a first print instruction". The CPU executing S180 is an example of "sending the first device identifying information and the print data". The Busy information is an example of the first information. The CPU executing S260 is an example of "receiving first information". The CPU executing S265 is an example of "sending an instruction information". The CPU executing S510 is an example of "receiving first push notification". The CPU executing S525 is an example of "sending the print data". The notification images P1, P3 are examples of a first image. The CPU executing S514, S516 is an example of "displaying a first image". The CPU executing S520 is an example of "accepting the input of the second print instruction". The pop-ups are examples of a first display type. The icons are example of a second display type. The CPU executing S595 is an example of "receiving a second push notification". The CPU executing S597 is an example of "displaying a second image".

What is claimed is:

1. An image processing device comprising:
   a controller;
   a communication interface configured to communicate with a push notification server and an information processing device;
   a memory; and
   a printer;
   wherein the controller is configured to perform:
   a first-receiving of receiving print data and device identifying information for identifying the information processing device through the communication interface;
   a determining whether or not a particular event in which printing cannot be executed in the image processing device is occurring in the image processing device;
   a first-storing of storing the received print data in the first-receiving in the memory in a case where it is determined that the particular event is not occurring at the time when the device identifying information was received;
   a second-storing of storing the received device identifying information in the memory in a case where it is determined that the particular event is occurring at the time when the device identifying information was received;
   sending the device identifying information to the push notification server through the communication interface in a case where the device identifying information is stored in the memory and it is determined that the particular event has ended;
   a second-receiving of receiving print data from the information processing device corresponding to the sent device identifying information;
   a third-storing of storing the received print data in the second-receiving in the memory; and
   printing by the printer using the print data stored in the memory in at least one of the first-storing and the third-storing.

2. The image processing device according to claim 1, wherein
   the controller is further configured to perform deleting the device identifying information from the memory in accordance with the printing being started.

3. The image processing device according to claim 1, wherein
   the information processing device includes a first information processing device and a second information processing device,
   in the determining, it is determined that the particular event is occurring in a case where the printing is being executed using first print data received from the first information processing device at the time when second device identifying information that identifies the second information processing device is received from the second information processing device, the second-storing includes storing the second device identifying information in the memory, the controller is further configured to perform sending, to the push notification server through the communication interface, first device identifying information that identifies the first information processing device in a case where it is determined in the determining that the printing using the first print data has been completed, the sending of the device identifying information includes sending the second device identifying information to the push notification server in a case where it is determined in the determining that the printing by the printer using the first print data has been completed and the second device identifying information is stored in the memory, the controller is further configured to perform:
receiving second print data from the second information processing device after having sent the second device identifying information to the push notification server; and printing by the printer using the received second print data.

4. The image processing device according to claim 3, wherein
the controller is further configured to perform sending first information to the second information processing device in the case where the printing is being executed using the first print data at the time when the second device identifying information is received from the second information processing device,
the first information indicating that the particular event is occurring,
the second-storing includes storing the second device identifying information in the memory in a case where second information is received from the second information processing device after having sent the first information,
the second information instructing the image processing device to wait to print.

5. The image processing device according to claim 3, wherein
the information processing device further includes a third information processing device,
in the determining, it is determined that the particular event is occurring in a case where the second device identifying information is stored in the memory at the time when third device identifying information that identifies the third information processing device is received from the third information processing device,
the second-storing includes storing the third device identifying information in the memory,
the controller is further configured to perform sending, to the push notification server through the communication interface, the second device identifying information that identifies the second information processing device in a case where it is determined in the determining that the printing using the second print data is completed,
the sending of the device identifying information includes sending the third device identifying information to the push notification server in a case where it is determined that the printing using the second print data is completed and the third device identifying information is stored in the memory, the controller is further configured to perform:
receiving third print data from the third information processing device after having sent the third device identifying information to the push notification server; and printing by the printer using the received third print data.

6. The image processing device according to claim 5, wherein
the controller is further configured to perform:
deleting the second device identifying information from the memory in a case where the second print data is not received from the second information processing device within a predetermined period since when the second device identifying information was sent to the push notification server; and
sending the second device identifying information to the push notification server in a case where the second device identifying information is deleted in the deleting.

7. The image processing device according to claim 6, wherein
the controller is further configured to perform sending the third device identifying information to the push notification server in a case where the third device identifying information is stored in the memory at the time when the second device identifying information was deleted.

8. A non-transitory computer-readable recording medium storing computer-readable instructions for an information processing device, wherein the information processing device comprises a controller; a communication interface configured to communicate with a push notification server and an image processing device; and a memory,
the computer-readable instructions, when executed by the controller of the information processing device, causing the information processing device to perform:
receiving first device identifying information from the push notification server through the communication interface,
the first device identifying information being information for informing the push notification server that the information processing device is a destination of a push notification;
accepting an input of a first print instruction that instructs an execution of printing using print data stored in the memory to the image processing device;
sending the first device identifying information and the print data to the image processing device through the communication interface when the input of the first print instruction is accepted in the accepting;
receiving first information from the image processing device in a case where a particular event in which printing cannot be executed is occurring in the image processing device,
the first information indicating that the particular event is occurring;
sending an instruction information to the image processing device in a case where the first information is received in the receiving of the first information,
the instruction information being an instruction for causing the image processing device to queue the first device identifying information;

receiving first push notification that notifies a completion of the printing from the push notification server after having sent the instruction information to the image processing device; and sending the print data to the image processing device in a case where the first push notification is received in the receiving of the first push notification.

9. The non-transitory computer-readable recording medium of claim 8, wherein the computer-readable instructions, when executed by the controller of the information processing device, cause the information processing device to perform:

displaying a first image on a display of the information processing device in a case where the first push notification is received, the first image being for accepting an input of a second print instruction that instructs the image processing device to print using the sent print data; and accepting the input of the second print instruction, the sending of the print data includes sending the print data to the image processing device on condition that the input of the second print instruction is accepted in the accepting.

10. The non-transitory computer-readable recording medium of claim 9, wherein the displaying of the first image includes:

displaying the first image by a first display type in a case where the computer-readable instructions are executed in the information processing device with higher priority than other sets of computer-readable instructions; and displaying the first image by a second display type in a case where the computer-readable instructions are not executed with priority, and the first image displayed by the first display type is larger than the first image displayed by the second display type.

11. The non-transitory computer-readable recording medium of claim 9, wherein the computer-readable instructions, when executed by the controller of the information processing device, cause the information processing device to perform:

receiving a second push notification from the push notification server in a case where the input of the second print instruction was not accepted in the accepting, the second push notification notifying that a print reservation has been cancelled; and displaying a second image on the display of the information processing device in a case where the second push notification is received, the second image indicating that the printing using the sent print data cannot be executed in the image processing device.

12. The non-transitory computer-readable recording medium of claim 9, wherein the image processing device is configured to queue second device identifying information for identifying other information processing device other than the information processing device itself, the first push notification includes queue information indicating a waiting order of the first device identifying information and the second device identifying information queued in the image processing device, the computer-readable instructions, when executed by the controller of the information processing device, cause the information processing device to perform determining whether or not a turn to print the print data stored in the information processing device has arrived, the determining being performed in a case where the first push notification is received, and being performed based on the queue information, and the sending of the print data includes sending the print data to the image processing device in a case where it is determined in the determining that the turn to print the print data in the image processing device has arrived.

* * * * *